United States Patent [19]

Fletcher et al.

[11] Patent Number: 5,134,632
[45] Date of Patent: Jul. 28, 1992

[54] DECODING BINARY-CODED TRANSMISSIONS

[75] Inventors: William H. Fletcher, Leicester; Simon C. Wegerif; Christopher J. Travis, both of London, all of United Kingdom

[73] Assignee: British Broadcasting Corporation, London, England

[21] Appl. No.: 639,559

[22] Filed: Jan. 10, 1991

[30] Foreign Application Priority Data

Apr. 19, 1990 [GB] United Kingdom ............... 9008765

[51] Int. Cl.$^5$ ............................................. H03K 9/08
[52] U.S. Cl. ........................................ 375/22; 375/76; 329/313; 340/825.63
[58] Field of Search ................. 375/22, 76, 94; 370/8, 370/9; 329/312, 313; 340/825.63; 331/53

[56] References Cited

U.S. PATENT DOCUMENTS

| | | | |
|---|---|---|---|
| 4,034,340 | 7/1977 | Sant'Agostino | 375/76 |
| 4,479,266 | 10/1984 | Eumurian et al. | 375/76 |
| 4,571,547 | 2/1986 | Day | 375/76 |

OTHER PUBLICATIONS

CCIR Recommendation 647, 1986. pp. 311–320.

*Primary Examiner*—Benedict V. Safourek
*Assistant Examiner*—Young Tse
*Attorney, Agent, or Firm*—Robert F. O'Connell

[57] ABSTRACT

A biphase-mark coded digital audio signal comprising short and long pulses (IEC 958) is decoded despite substantial variation of sample rate but without a separate synchronization or timing signal and without a phase locked loop. The pulse lengths are measured and then compared with two thresholds. One is a variable threshold which is 1.5 times the average length of the short pulses, this average being stored in a register. This will normally be adequate to discriminate the short and long pulses. The second comparison is with a fixed value which is lower than 1.5 times the pulse length at the highest input frequency. When the comparators disagree irreconcilably in their determination, the resultant of the second comparison is used instead of the first. This allows the system to respond quickly to start-up or sudden change in input data rate.

12 Claims, 5 Drawing Sheets

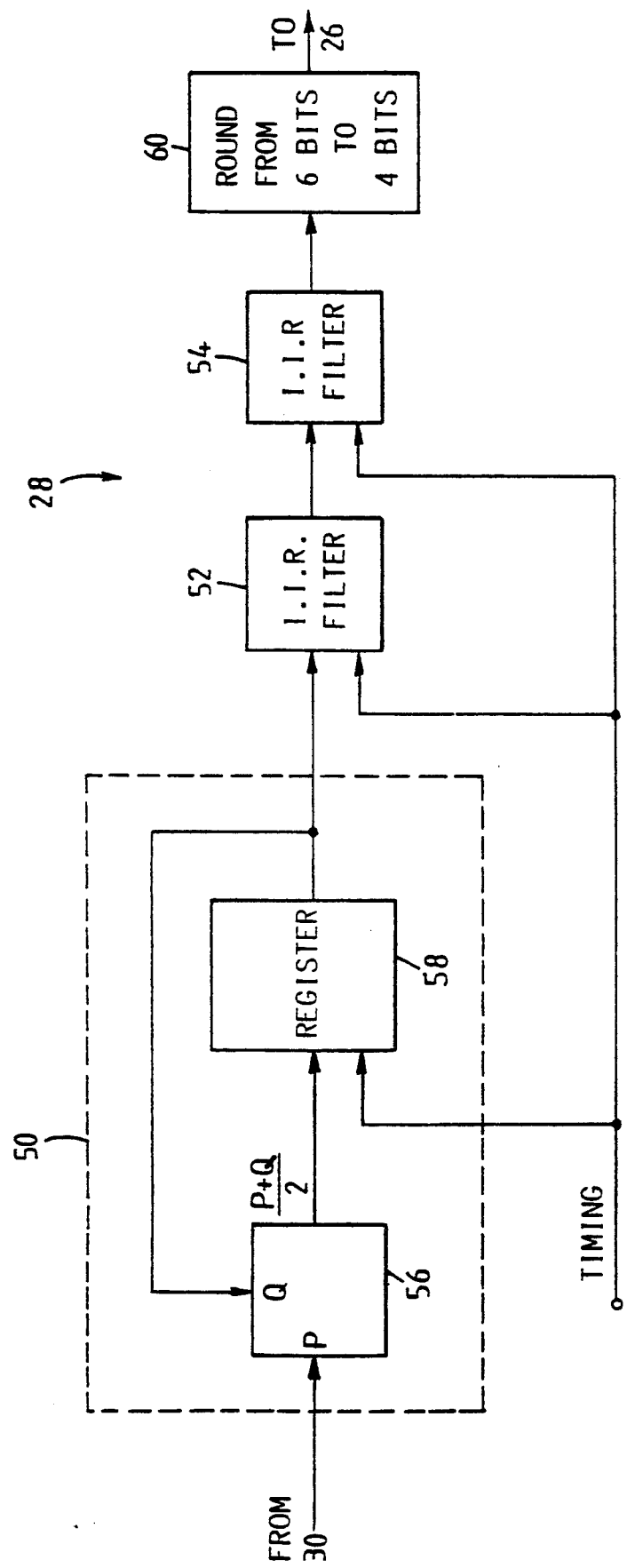

DECODING BINARY-CODED TRANSMISSIONS

BACKGROUND OF THE INVENTION

This invention relates to the decoding of binary-coded transmissions in which the digits are coded by variations in effective pulse length. An example of such a code is the biphase-mark code.

In a biphase-mark code the digits 0 and 1 are transmitted by pulses of different lengths, the pulse length for a one being half the duration of the pulse length for a zero. The digits are however transmitted at a steady rate, so two short pulses are actually transmitted to indicate a one and one long pulse is transmitted to indicate a zero. A pulse in this context can be positive-going or negative going, and the beginning of a pulse is defined by the existence of a change in polarity. A biphase-mark code is illustrated in FIG. 1.

It can be seen from FIG. 1 that each bit to be transmitted can be said to be defined by two consecutive binary states. The first state of a symbol is always different from the second state of the previous symbol. To transmit a zero, the second state of the symbol is the same as the first state of the same symbol. To transmit a one, the second state of the symbol is different from the first state of the same symbol. The code has the advantage of having no (or constant) mean d.c. value.

At a receiver such a code may be decoded by measurement of the length of the pulses. A one will thus be decoded as two short-length pulses, and a zero will be decoded as one long pulse. The critical discriminating factor between zeros and ones is the length of the pulses.

The biphase-mark code has been specified for the transmission of two-channel, serial digital audio data within broadcasting installations, in AES 3.1985, now incorporated in IEC 958. To support most common sampling rates, plus a margin for varispeed, it may be desired to decode signals received with a wide range of sample rates, for example from 28 KHz to 54 kHz. The corresponding bit rate is 64 times the sample rate. The code is also used in consumer digital audio applications. The signal is not accompanied by any separate synchronising or timing signal, and thus the receiver/decoder has to determine the sample rate itself, over a range which is virtually 2:1, using only the pulses themselves. The signal may have to travel over several hundred metres of cable which further distorts the timing of the transitions and hence the length of pulses received. This requirement presents substantial problems.

SUMMARY OF THE INVENTION

The present invention in its various aspects is defined in the appended claims to which reference should now be made.

Briefly, the invention provides a system in which a biphase-mark coded digital audio signal comprising short and long pulses is decoded, despite substantial variation of sample rate, but without a separate synchronisation or timing signal and without a phase locked loop. The pulse lengths are measured and then compared with two thresholds. One is a variable threshold which is 1.5 times the average length of the short pulses, this average being stored in a register. This will normally be adequate to discriminate the short and long pulses. The second comparison is with a fixed value which is lower than 1.5 times the pulse length at the highest input frequency. When the comparators disagree irreconcilably in their determination, the resultant of the second comparison is used instead of the first. This allows the system to respond quickly to start-up or sudden change in input data rate.

BRIEF DESCRIPTION OF THE DRAWINGS

The invention will now be described in more detail, by way of example, with reference to the accompanying drawings, in which:

FIG. 7 is a block schematic of the average circuit 28 used in FIGS. 2 and 5.

DETAILED DESCRIPTION OF THE PREFERRED EMBODIMENT

Figure 1:
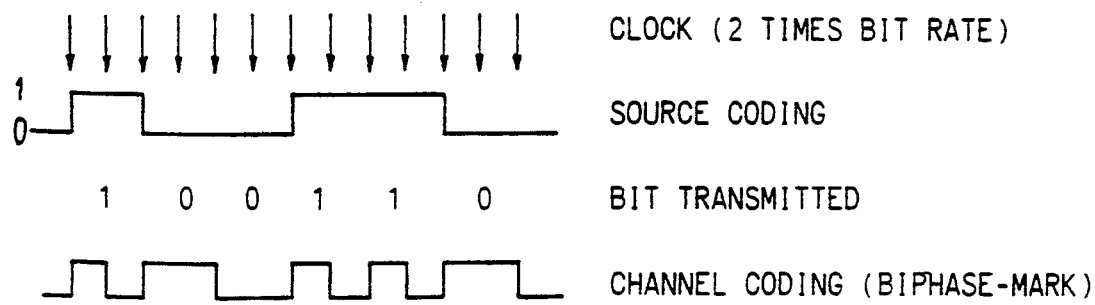
FIG. 1 (referred to above) illustrates the biphase-mark code.
Figure 2:
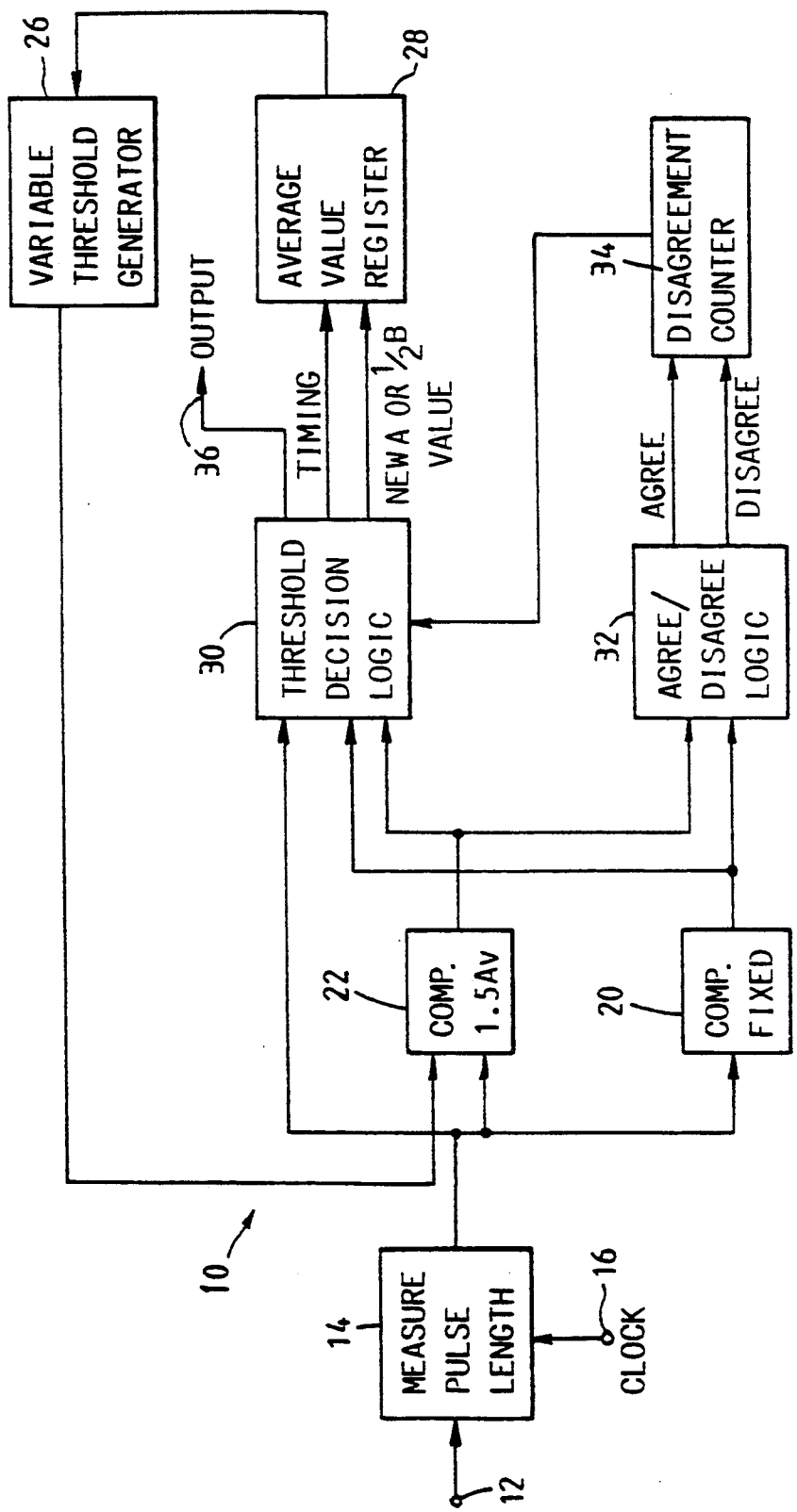
FIG. 2 is a block schematic of a receiver/decoder circuit embodying the invention for discriminating the received binary pulses.

The receiver/decoder 10 shown in FIG. 2 is designed to discriminate the 0 and 1 pulses of the code of FIG. 1 over a wide variation of sample rates and with a degree of transmission distortion. An almost 2:1 variation in sample rates means that the short pulses at the lower sample rate have essentially the same duration as the long pulses at the higher sample rate. A simple discrimination system is therefore impossible.

The circuit 10 of FIG. 2 has an input 12 for receiving the biphase-mark coded signal which is to be received and decoded. This is applied to a pulse length measuring circuit 14 of known type which measures the pulse length by sampling the input at a rate substantially higher than the maximum input pulse rate and counting the number of sampling intervals between input transitions. The circuit 14 receives a high frequency clock input 16. This count is then applied to one input of each of two threshold comparators which compare the output of the length measuring circuit 14 with predetermined values. More particularly, a first comparator 20 compares the output of the circuit 14 with a fixed threshold value held in the comparator 20, whereas a second comparator 22 compares the output of circuit 14 with a variable threshold value applied from a variable threshold value generator 26. The variable threshold value generator 26 generates the variable threshold value in dependence upon the output of an average value register 28. In the present example, the variable threshold value is one and a half times the average value held in register 28, so that generator 26 effectively multiplies by 1.5.

The average value register 28 receives the output of threshold decision and average update logic 30, the operation of which is described in more detail below, together with associated timing information. The logic 30 receives the length measurement from measuring circuit 14 and also the outputs of the comparators 20 and 22. The outputs of the comparators 20 and 22 are also applied to agree/disagree logic 32. A disagreement counter 34 is connected to the agree and disagree outputs of logic 32 and supplies a control output to the logic 30. The logic 30 also supplies the decoder output 36.

The operation of the circuit of FIG. 2 will now be described. The average value register 28 holds an average value of the short pulse length, as measured by circuit 14. It is convenient to call the short pulses A pulses, and the long pulses B pulses. The average is thus calculated by halving the measured length of the B pulses and then taking a time average of the A and ½B pulse lengths. The term average is here used in a general rather than a strict mathematical sense and the precise function can be chosen in many ways to produce a running average or mean value derived from the recently received input values as will be apparent to those skilled in the art.

When the system is running normally, therefore, comparator 22 compares the incoming measured pulse lengths with 1.5 times the average value of the A pulses, this being mid-way between the normal values for the A and B pulse types. If the pulses are arriving with consistent timing, this will accurately discriminate A pulses, of length equal to the stored average, from B pulses, of length twice that of the stored average.

However, this situation does not always obtain, and the most obvious example of this is at initial start-up of the decoder. It is convenient, for self-test routines, to arrange that the value held in the average value register 28 on start-up is zero, and it is also prudent design to allow for any value in the average register during normal operation. In circumstances where the average value stored is much too low, or is set to zero from power up, every pulse will be identified as a B pulse, which is clearly not right. What is more, the system can stay locked in this condition, or at least take a long time to come out of it.

At this point the fixed threshold comparator 20 comes into play. The fixed threshold is arranged to be less than 1.5 times the average A value over the whole sampling rate range of the input signal with which the circuit is to operate. Typically, with a 2:1 sampling rate range the fixed threshold is set at about equal to the nominal length of the A pulses at the bottom end of the sampling rate range. Typical threshold values are diagrammatically indicated in FIG. 3.

The assumption is made that all pulses which have a length less than that set by the fixed threshold are A pulses. In steady state operation, these pulses will of course also be identified as A pulses by the variable threshold comparator 22.

But this is not true at start-up. When the stored average value is zero, even a short pulse, which the fixed threshold comparator 20 notes is an A pulse, will have a duration greater than the variable threshold comparator 22, which thus detects it as a B pulse. The comparator 22, which is supposed to have a higher threshold, says it is a long B pulse, while comparator 20, supposedly with a lower threshold, says it is a short A pulse. This then constitutes an irreconcilable disagreement between the comparator outputs which is detected by the agree/disagree logic 32.

Because of the pulse length measurement method used in circuit 14, the pulse durations are quite coarsely measured. There is a degree of quantisation in the measurement method. This means that occasional disagreements will occur in normal system operation. Also, due to transmission degradation, occasional short A pulses may be received which can momentarily depress the average value and cause a disagreement. Generally, the effect of transmission over longer cables is to make isolated A pulses shorter in duration at the receiver. Hence there are always some pulses under the fixed threshold limit. The disagreement counter 34 is included to act on the disagreements only after it has counted a predetermined number of disagreements. Then the counter suplies a signal to the threshold decision logic 30 to change its mode of operation. The number of disagreements required before a signal is applied to the threshold decision logic 30 is chosen in dependence upon the precision with which measurements are made and the stability of the average value when occasional very short A pulses are received. In the illustrated embodiment the number is three.

The logic 30 receives the measured pulse length from circuit 14 and if it represents an A pulse uses it directly in calculating the average, while if it represents a B pulse halves it first before using it to calculate the average. In the normal mode of operation, the output of the variable threshold comparator 22 is used to tell the logic 30 whether the pulse being received is an A pulse or a B pulse. However, when the disagreement counter 34 registers a count of 3, it commands the threshold decision logic to use instead the output of the fixed comparator 20 to tell it whether an A pulse or a B pulse is being received. In this mode the system moves rapidly to a situation in which the threshold value of 1.5 times the average value of A pulses is again larger than the predetermined fixed threshold value, and then the circuit starts working normally again.

The above description has shown how the circuit can cope with the anomalous start-up conditions, but it will be appreciated that it can recover quickly from any change or variation in pulse length by this process. On reason why it responds quickly is that it does not involve the use of a phase locked loop, as do conventional biphase-mark decoders.

One special situation needs to be considered, in which the input signal comprises a long succession of B pulses without any A pulses. It has been seen that the agree/disagree logic only responds to incoming A pulses, thus when there is a long succession of B pulses there are no detected "agreements" or "disagreements". Equally, it has been noted that the measurement method inherently causes an occasional apparent but spurious disagreement. To overcome this, the agree/disagree logic responds to the reception of a long succession of B pulses by counting the counter 34 down. The counter is counted down by one for every group of n successive B pulses. Thus the counter 34 is an up-down counter, the count of which can range between zero and three. In the present example the value of n is four. This number is chosen in dependence upon the maximum time between A pulses and the maximum count of the disagreement counter.

Figure 4:
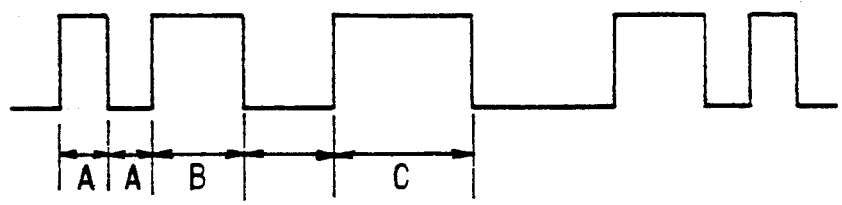
FIG. 4 is a diagram showing pulses A and B and also pulses C which violate the biphase-mark code.

FIG. 4 shows a biphase-mark coded signal with pulses A and B, which also carries pulse C which constitute a violation of the convention used to define pulses A and B, and have a pulse duration three times that of an A pulse. Such pulses are used in the digital audio interface defined in IEC 958 to define the frame and block structure and are thus relatively infrequent but have to be allowed for. The presence of these C pulses makes a simple decoding scheme impossible for input signals having a variable sample rate.

Figure 5:
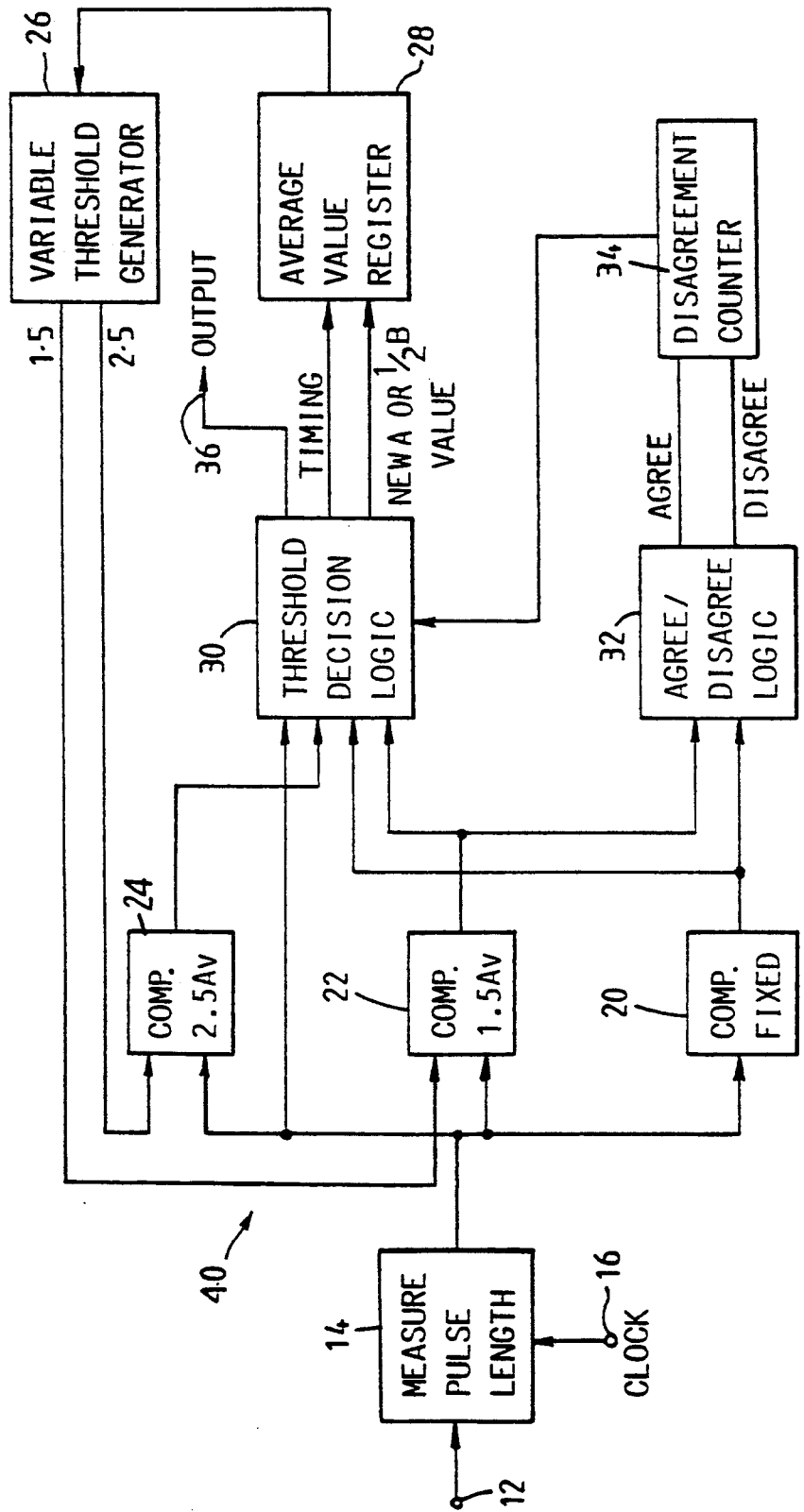
FIG. 5 is a block schematic of a modified receiver/decoder circuit embodying the invention for discriminating the three pulse types A, B and C.

FIG. 5 shows how the circuit of FIG. 2 can be modified to take account of such C pulses. In this modified decoder 40, a third comparator 24 is included and the threshold generator 26 generates a second variable threshold which is 2.5 times the average value of the A pulses and which is applied to the third comparator 24. The operation of comparator 24 then essentially parallels that of comparator 22. When a C pulse is detected its length is ideally divided by 3 before being used in the average. In practice, C pulses may be sufficiently infrequent for their values to simply be ignored in the average, or they can be divided by two, like the B pulses.

Figure 3:
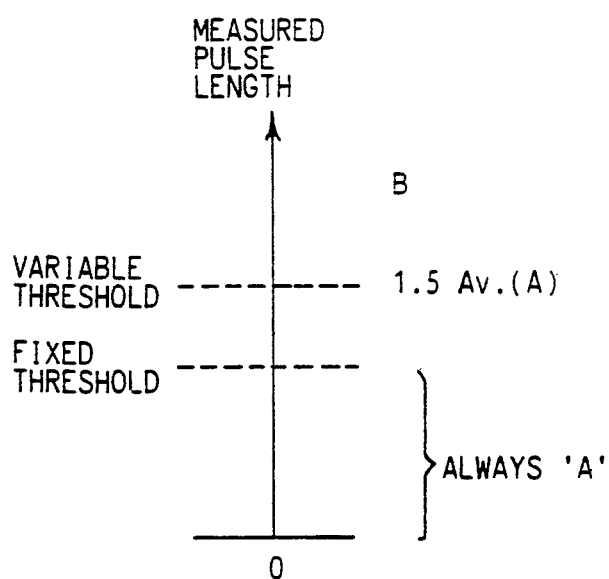
FIG. 3 is a diagram showing thresholds used in the circuit of FIG. 2.
Figure 6:
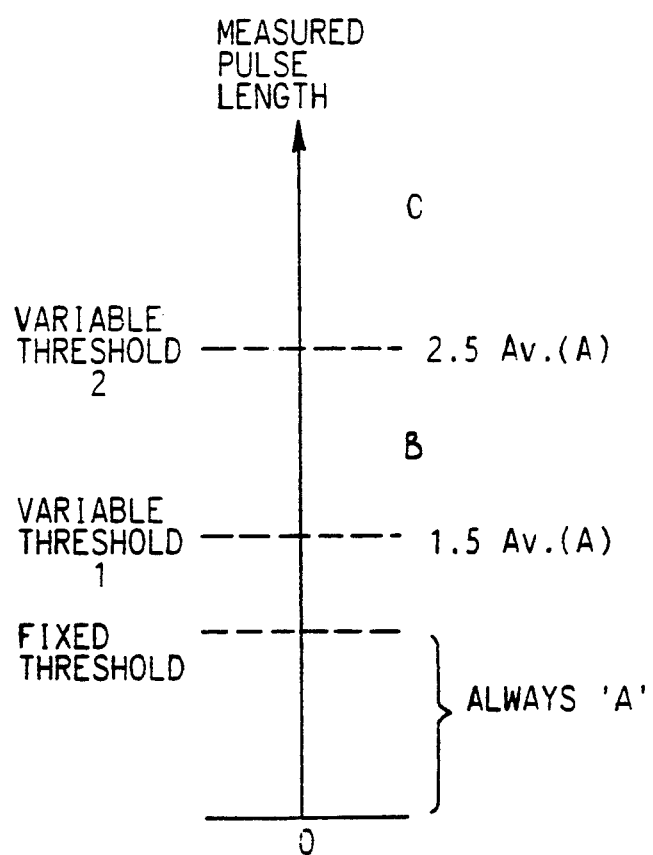
FIG. 6 is a diagram similar to FIG. 3 showing thresholds used in the circuit of FIG. 5.

FIG. 6 shows the three thresholds used in FIG. 5 in similar manner to FIG. 3.

The average value register 28 used in both FIG. 2 and FIG. 5 can be constructed as shown in FIG. 7. The circuit comprises three cascaded infinite impulse response filters 50, 52 and 54, one (50) of which is shown in detail. Each stage comprises a halving adder 56 and a register 58, with the register output being coupled to one input of the adder. The final result is rounded from six to four bits in a rounding circuit 60.

To be able to detect the pulses in a real situation with data sample rates of up to 54 KHz and bit rates of 64 times that requires a high sampling rate to be used in the circuit 14. Measurement sampling rates of at least six or seven time the maximum input pulse rate are desirable. The high frequency clock signal required may be derived externally using a conventional crystal-based oscillator.

The circuits illustrated are preferably fabricated in integrated circuit form. They can be used to connect different digital audio equipment items, and can also be used in a repeater station for boosting signals on a long transmission cable. In principle they could be implemented in software, at least for lower sample rates, in which case FIGS. 2 and 5 are best regarded as logic diagrams or flow charts.

The circuits can cope with a wide range of input data rates without any indication of the data rate being given. They respond quickly to changes and in one example a decoder consistently recovers from start-up or a catastrophic error situation in three to four samples only. The absence of a phase locked loop is important in this. Nevertheless the circuit is relatively simple and does not require large numbers of circuit elements.

It will be appreciated that many modifications are possible to the systems described. In particular, the average value stored can be arbitrarily related to the input pulse lengths, e.g. it can be the mean B pulse length with the values of A pulses being doubled before being used. The multiplier factors in the variable threshold generating circuit are then adjusted accordingly. More radical alterations e.g. to the threshold levels are also possible. Other pulse width ratios are possible, and in general for a binary system with a 1:n pulse ratio, a 1:n sample rate range receiver can be designed. If the pulse length measurement circuit 14 is replaced with an analogue-to-digital converter giving a measurement of instantaneous pulse amplitude, the circuit can then operate directly on pulse amplitude; alternatively it can be replaced by another circuit which converts other forms of bi-state coding into a magnitude value which can be processed by the system.

We claim:

1. A decoder for receiving and decoding binary-coded transmissions in which transmitted bits are coded by variations in effective pulse length, the state of the input bits being represented by pulses which can selectively take one of at least two pulse lengths which are related to each other by a multiplying factor but the absolute values of which are variable over a permitted range, the decoder comprising:

an input for receiving transmitted pulses;

measurement means coupled to the input for measuring the length of each received input pulse;

average value storage means coupled to the measurement means for maintaining an average value related to the lengths of at least the recently received input pulses;

threshold generating means coupled to the average value storage means for generating a variable threshold corresponding to a pulse length intermediate the two pulse lengths permitted to the input signal;

first comparator means coupled to the outputs of the measurement means and to the threshold generating means to provide a first empirical determination of which bit state the current input pulse represents;

second comparator means coupled to the output of the measurement means for comparing measured pulse lengths with a fixed threshold which is below the range of values permitted to the variable threshold over the permitted range of input pulse lengths, to provide a second empirical determination of which bit state the current input pulse represents; and detecting means coupled to the first and second comparator means for detecting agreement and disagreement between the first and second empirical determinations and in the event of an irreconcilable disagreement between them, selecting the second empirical determination as correct, and, when an agreement or normal disagreement between them is detected, selecting the first empirical determination as correct;

the average value storage means being coupled to the first and second comparator means, and also to said detecting means such as to update the average value using a value derived from the input pulse length in dependence upon the selected empirical determination of the received bit state.

2. A decoder according to claim 1, in which said detecting means includes a counter which is counted up by detected irreconcilable disagreements and which selects the second empirical determination only when it reaches a predetermined count.

3. A decoder according to claim 2, in which the counter is counted down in response to a succession of input pulses when neither agreement nor disagreement is detected.

4. A decoder according to claim 1, for use with input signals which comprise a third pulse length greater than the said two pulse lengths, and further comprising third comparator means coupled to the outputs of the measurement means and to the threshold generating means to provide a third empirical determination of which state the current input pulse represents by comparing the input pulse length with a second variable threshold corresponding to a pulse length intermediate the third pulse length and the other pulse lengths.

5. A machine method of discriminating between two values taken by a succession of inputs which can each selectively take one of at least two states, the input in one state having a value which is related to the value in the other state by a multiplying factor, but the absolute values available to the inputs not being fixed but rather being variable with time over a permitted range; the method comprising the steps of:

measuring the value of each received input;

maintaining an average value related to at least the recently received input values;

comparing each input value with a variable threshold related to the average value, the variable threshold corresponding to an input value intermediate the input values in the two said states, to provide a first empirical determination of which state the current input represents;

comparing each input value with a fixed threshold which is below the range of values permitted to the variable threshold over the permitted range of input values, to provide a second empirical determination of which state the current input represents;

detecting agreement and disagreement between the first and second empirical determinations and in the event of an irreconcilable disagreement between them, selecting the second empirical determination as correct, and, when an agreement or normal disagreement between them is detected, selecting the first empirical determination as correct; and updating the average value using a value derived from the input value in dependence upon the selected empirical determination of the input state.

6. A decoder for receiving and decoding binary-coded transmissions in which transmitted bits are coded by variations in effective pulse length, the state of the input bits being represented by pulses which can selectively take one of at least two pulse lengths which are related to each other by substantially the factor two but the absolute values of which are variable over a permitted range, the decoder comprising:

an input for receiving transmitted pulses;

measurement means coupled to the input for measuring the length of each received input pulse;

average value storage means coupled to the measurement means for maintaining an average value related to the lengths of at least the recently received input pulses;

threshold generating means coupled to the average value storage means for generating a variable threshold corresponding to a pulse length intermediate the two pulse lengths permitted to the input signal;

first comparator means coupled to the outputs of the measurement means and to the threshold generating means to provide a first empirical determination of which bit state the current input pulse represents;

second comparator means coupled to the output of the measurement means for comparing measured pulse lengths with a fixed threshold which is below the range of values permitted to the variable threshold over the permitted range of input pulse lengths, to provide a second empirical determination of which bit state the current input pulse represents; and detecting means coupled to the first and second comparator means for detecting agreement and disagreement between the first and second empirical determinations and in the event of an irreconcilable disagreement between them, selecting the second empirical determination as correct, and, when an agreement or normal disagreement between them is detected, selecting the first empirical determination as correct.

7. A decoder according to claim 6, in which the average value represents about 1.5 times the length of pulses of the shorter pulse length.

8. A decoder according to claim 7, for use with input signals which comprise a third pulse length substantially three times the shortest pulse length, and further comprising third comparator means coupled to the outputs of the measurement means and to the threshold generating means to provide a third empirical determination of which state the current input pulse represents by comparing the input pulse length with a second variable threshold corresponding to a pulse length about 2.5 times the length of pulses of the shortest pulse length.

9. A decoder for discriminating between two values taken by a succession of inputs which can each selectively take one of at least two states, the input in one state having a value which is related to the value in the other state by a multiplying factor, but the absolute values available to the inputs not being fixed but rather being variable with time over a permitted range; the decoder comprising:

means for measuring the value of each received input;

means for maintaining an average value related to at least the recently received input values;

means for comparing each input value with a variable threshold related to the average value, the variable threshold corresponding to an input value intermediate the input values in the two said states, to provide a first empirical determination of which state the current input represents;

means for comparing each input value with a fixed threshold which is below the range of values permitted to the variable threshold over the permitted range of input values, to provide a second empirical determination of which state the current input represents;

means for detecting agreement and disagreement between the first and second empirical determinations and in the event of an irreconcilable disagreement between them, selecting the second empirical determination as correct, and, when an agreement or normal disagreement between them is detected, selecting the first empirical determination as correct; and means for updating the average value using a value derived from the input value in dependence upon the selected empirical determination of the input state.

10. A decoder according to claim 9, in which the average value represents a value about 1.5 times the values of the inputs of that state having the lower value.

11. A machine of discriminating between two values taken by a succession of inputs which can each selectively take one of at least two pulse lengths, the input in one state having a pulse length which is related to the pulse length in the other state by a multiplying factor, but the absolute values of the pulse lengths not being fixed but rather being variable with time over a permitted range; the method comprising the steps of:

measuring the length of each received input pulse;

maintaining an average value related to the lengths of at least the recently received input pulses;

comparing each input pulse length with a variable threshold related to the average pulse length, the variable threshold corresponding to an input pulse length intermediate the input pulse lengths in the two said states, to provide a first empirical determination of which state the current input pulse represents;

comparing each input pulse length with a fixed threshold which is below the range of pulse lengths permitted to the variable threshold over the permitted range of input pulse lengths, to provide a second empirical determination of which state the current input pulse represents;

detecting agreement and disagreement between the first and second empirical determinations and in the event of an irreconcilable disagreement between them, selecting the second empirical determination as correct, and, when an agreement or normal disagreement between them is detected, selecting the first empirical determination as correct.

12. A method according to claim 11, in which the received input pulses are coded by means of a biphase-mark code.

* * * * *